(12) United States Patent
Kujala (10) Patent No.: US 11,661,308 B2
(45) Date of Patent: May 30, 2023

(54) SOLUTION FOR GENERATING INSPECTION INFORMATION OF A PLURALITY OF SIGNALIZATION ELEMENTS OF AN ELEVATOR SYSTEM

(71) Applicant: Kone Corporation, Helsinki (FI)

(72) Inventor: Matti Kujala, Helsinki (FI)

(73) Assignee: Kone Corporation, Helsinki (FI)

( * ) Notice: Subject to any disclaimer, the term of this patent is extended or adjusted under 35 U.S.C. 154(b) by 384 days.

(21) Appl. No.: 16/845,583

(22) Filed: Apr. 10, 2020

(65) Prior Publication Data
US 2020/0339383 A1    Oct. 29, 2020

(30) Foreign Application Priority Data

Apr. 26, 2019  (EP) ..................................... 19171319

(51) Int. Cl.
| | | |
|---|---|---|
| *H04L 29/08* | (2006.01) | |
| *B66B 1/34* | (2006.01) | |
| *H04W 4/33* | (2018.01) | |
| *B66B 5/00* | (2006.01) | |
| *H04L 67/125* | (2022.01) | |
| *H04W 4/20* | (2018.01) | |

(52) U.S. Cl.
CPC .......... *B66B 1/3461* (2013.01); *B66B 5/0006* (2013.01); *H04L 67/125* (2013.01); *H04W 4/20* (2013.01); *H04W 4/33* (2018.02)

(58) Field of Classification Search
CPC ....... H04L 45/02; H04L 49/109; H04L 49/30; H04L 45/60
See application file for complete search history.

(56) References Cited

U.S. PATENT DOCUMENTS

| | | |
|---|---|---|
| 4,646,058 A | 2/1987 | Mandel et al. |
| 4,650,037 A | 3/1987 | Husson et al. |
| 5,952,627 A | 9/1999 | Park |

(Continued)

FOREIGN PATENT DOCUMENTS

CA    3062272 A1 * 10/2018 ............. H04L 45/24

OTHER PUBLICATIONS

Extended European Search Report for European Application No. 19171319.7 dated Nov. 12, 2019.

*Primary Examiner* — Eunsook Choi
(74) *Attorney, Agent, or Firm* — Harness, Dickey & Pierce, P.L.C.

(57) ABSTRACT

The invention relates to a system for generating inspection information of a plurality of signalization elements of an elevator system. The system comprises: an elevator control unit configured to control the plurality of the signalization elements of the elevator system, and a mobile terminal device communicatively coupled to the elevator control unit. The mobile terminal device is configured to generate to the elevator control unit at least one control signal comprising an instruction to activate the plurality of the signalization elements according to a predetermined activation pattern. The elevator control unit is configured to activate the plurality of the signalization elements according to the predetermined activation pattern for generating inspection information in response to receiving the at least one control signal. The invention relates also to for generating inspection information of a plurality of signalization elements of an elevator system.

21 Claims, 4 Drawing Sheets

(56) References Cited

U.S. PATENT DOCUMENTS

| | | | | |
|---|---|---|---|---|
| 9,802,789 | B2* | 10/2017 | Kim | B66B 5/0012 |
| 2015/0154524 | A1* | 6/2015 | Borodow | H04W 4/029 |
| | | | | 705/7.23 |
| 2019/0185293 | A1* | 6/2019 | Yang | H04W 4/021 |
| 2020/0031619 | A1* | 1/2020 | Sudi | B66B 9/00 |
| 2020/0095094 | A1* | 3/2020 | Gil-Arias | B66B 5/0018 |
| 2020/0130991 | A1* | 4/2020 | Simcik | B66B 1/3461 |
| 2020/0290842 | A1* | 9/2020 | Begle | B66B 5/0012 |
| 2021/0032078 | A1* | 2/2021 | Chiappa | B66B 5/0087 |
| 2021/0209882 | A1* | 7/2021 | Kuenzi | H04W 4/00 |
| 2021/0214185 | A1* | 7/2021 | Hiltunen | B66B 3/002 |

\* cited by examiner

SOLUTION FOR GENERATING INSPECTION INFORMATION OF A PLURALITY OF SIGNALIZATION ELEMENTS OF AN ELEVATOR SYSTEM

RELATED APPLICATIONS

This application claims priority to European Patent Application No. 19171319.7 filed on Apr. 26, 2019, the entire contents of which are incorporated herein by reference.

TECHNICAL FIELD

The invention concerns in general the technical field of elevator systems. Especially the invention concerns inspection of elevator systems.

BACKGROUND

Typically, in services of an elevator system, a service technician pays scheduled visit to check and maintain operation of an elevator system. Target is to secure safety and correct functionality of the equipment of the elevator system. If there is appears defects, faults and/or errors in the elevator system just after the service visit, it may cause inconvenience for passengers.

To support fluent and effective elevator usage, signalization elements may be arranged to landings to instruct the passengers to select an elevator car, which is travelling to a desired direction. For example, one or more signalization elements, e.g. hall lanterns (such as hall lantern up and hall lantern down), may be arranged in a close vicinity of a landing door of each elevator car to instruct the passenger to select the elevator car that is travelling to the desired direction. Especially, if the elevator system comprises a plurality of elevator cars, i.e. in case of an elevator group, the signalization elements are needed to enable efficient traffic.

To check the correct technical functionality, each and every single signalization element should be switched on to visually secure, that there are no "burned lights" or other defects in the signalization elements. If each signalization element is visually checked on every landing for every elevator car, it will be time consuming and will take far too long time. Typically, the service technician visits each landing, and has a general look on the signalization elements. But in practice the service technician cannot wait that all signalization elements in the same landing are switched on, e.g. all elevator cars are stopped at said landing in both travelling directions. Thus, it may be possible, that one or more signalization devices are defected, even during a long time, and the service technician does not detect it in the service visit(s).

Thus, there is need to develop further solutions in order to improve the inspection of the elevator signalization elements.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention.

The following summary merely presents some concepts of the invention in a simplified form as a prelude to a more detailed description of exemplifying embodiments of the invention.

An objective of the invention is to present a system and a method for generating inspection information of a plurality of signalization elements of an elevator system. Another objective of the invention is that the system and the method for generating inspection information of a plurality of signalization elements of an elevator system enable a quick and easy way to generate inspection information of a plurality of signalization elements.

The objectives of the invention are reached by a system and a method as defined by the respective independent claims.

According to a first aspect, a system for generating inspection information of a plurality of signalization elements of an elevator system is provided, wherein the system comprises: an elevator control unit configured to control the plurality of the signalization elements of the elevator system, and a mobile terminal device communicatively coupled to the elevator control unit, wherein the mobile terminal device is configured to generate to the elevator control unit at least one control signal comprising an instruction to activate the plurality of the signalization elements according to a predetermined activation pattern, and wherein the elevator control unit is configured to activate the plurality of the signalization elements according to the predetermined activation pattern for generating inspection information in response to receiving the at least one control signal.

The at least one control signal may further comprise an instruction to instruct the elevator system to an inspection state in which the plurality of the signalization elements may be configured to be activated according to the predetermined activation pattern.

The mobile terminal device may further be configured to generate to the elevator control unit at least one second control signal comprising an instruction to return the elevator system to a normal elevator operation state from the inspection state, and the elevator control unit may be configured to return the elevator system to the normal elevator operation state from the inspection state in response to receiving the at least one second control signal.

Alternatively, the elevator control unit may be configured to return the elevator system to a normal elevator operation state from the inspection state after a predetermined period of time.

The elevator control unit may be configured to activate the plurality of the signalization elements regardless of a location of at least one elevator car travelling inside respective at least one elevator shaft.

The predetermined activation pattern may comprise at least one of the following: temporary simultaneous activation of the plurality of the signalization elements, intermittent activation of the plurality of the signalization elements, consecutive activation of the plurality of the signalization elements.

The plurality of signalization elements may be light emitting elements.

Alternatively or in addition, the plurality of signalization elements may comprise one or more signalization elements of one or more hall lantern units arranged to a landing, one or more signalization elements of one or more landing call stations arranged to a landing, one or more signalization elements of a car operating panel arranged inside an elevator car, one or more elevator buttons comprising one or more light sources, and/or one or more matrix displays comprising a plurality of light sources.

The mobile terminal device may be one of the following: a mobile phone, a tablet computer, a dedicated mobile device.

The mobile terminal device may be communicatively coupled to the elevator control unit directly or via an external computing unit.

The elevator control unit may be configured to control the plurality of signalization elements directly or indirectly.

According to a second aspect, a method for generating inspection information of a plurality of signalization elements of an elevator system is provided, wherein the method comprises: generating from a mobile terminal device to an elevator control unit at least one control signal comprising an instruction to activate the plurality of the signalization elements according to a predetermined activation pattern, and activating the plurality of the signalization elements according to the predetermined activation pattern for generating inspection information in response to receiving the at least one control signal.

The at least one control signal may further comprise an instruction to instruct the elevator system to an inspection state in which the plurality of the signalization elements may be configured to be activated according to the predetermined activation pattern.

The method may further comprise: generating from the mobile terminal device to the elevator control unit at least one second control signal, wherein the at least one second control signal comprises an instruction to return the elevator system to a normal elevator operation state from the inspection state; and returning the elevator system to the normal elevator operation state from the inspection state in response to receiving the at least one second control signal.

Alternatively, the method may further comprise returning the elevator system to a normal elevator operation state from the inspection state after expiration of a predetermined period of time.

The plurality of the signalization elements may be activated regardless of a location of at least one elevator car travelling inside respective at least one elevator shaft.

The predetermined activation pattern may comprise at least one of the following: temporary simultaneous activation of the plurality of the signalization elements, intermittent activation of the plurality of the signalization elements, consecutive activation of the plurality of the signalization elements.

The plurality of signalization elements may be light emitting elements.

The plurality of signalization elements may comprise one or more signalization elements of one or more hall lantern units arranged to a landing, one or more signalization elements of one or more landing call station arranged to a landing, one or more signalization elements of a car operating panel arranged inside an elevator car, one or more elevator buttons comprising one or more light sources, and/or one or more matrix displays comprising a plurality of light sources.

The mobile terminal device may be one of the following: a mobile phone, a tablet computer, a dedicated mobile inspection device.

The mobile terminal device may be communicatively coupled to the elevator control unit directly or via an external computing unit.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

DESCRIPTION OF THE EXEMPLIFYING EMBODIMENTS

Figure 1A:
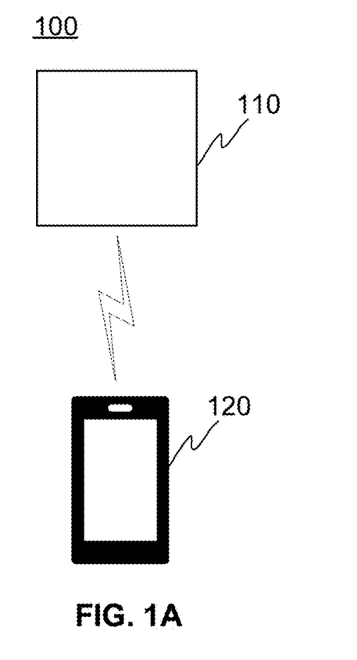
FIG. 1A illustrates schematically an example of a system according to the invention.
Figure 1B:
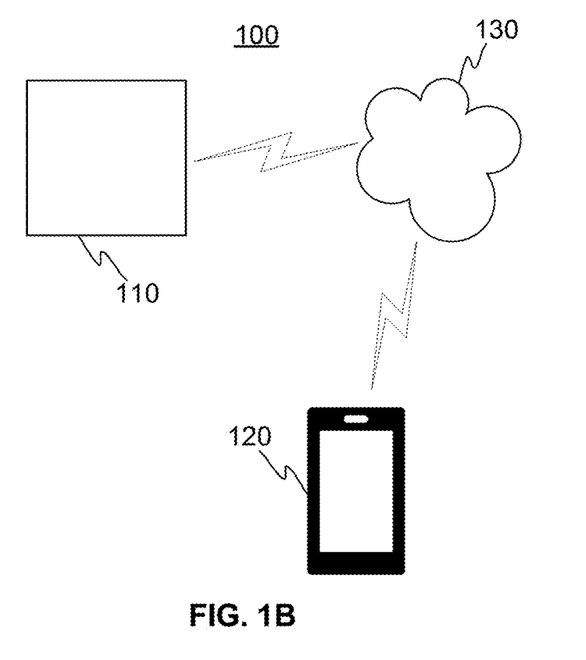
FIG. 1B illustrates schematically another example of a system according to the invention.

FIG. 1A illustrates schematically an example embodiment of a system 100 for generating inspection information of a plurality of signalization elements of an elevator system according to the invention. The inspection system 100 according to the invention comprises an elevator control unit 110 and a mobile terminal device 120. The mobile terminal device 120 may be communicatively coupled to the elevator control unit 110 directly as illustrated in FIG. 1A. Alternatively, the mobile terminal device 120 may be communicatively coupled to the elevator control unit 110 indirectly via an external computing unit 130. Some non-limiting examples of the external computing unit 130 may e.g. be a remote server, a cloud server, a remote maintenance server, an external computing circuit, an external network of computing devices. The external unit herein means a unit that locates separate from the elevator system. FIG. 1B illustrates schematically another example embodiment of a system 100 according to the invention, wherein the mobile terminal device 120 is communicatively coupled to the elevator control unit 110 via the external computing unit 130, e.g. a cloud server in this example. The communication between the mobile terminal device 120 and the elevator control unit 110 may be based on any wireless communication technologies, such as Bluetooth; wireless local area network (WLAN); mobile communication network, e.g. 5G; etc.

The elevator control unit 110 is configured to control a plurality of signalization elements 202a-202c, i.e. indicator elements, of the elevator system. The elevator control unit 110 may be configured to control the plurality of signalization elements 202a-202c directly or indirectly via e.g. one or more signalization controllers. The elevator system may comprise the elevator control unit 110, the plurality of signalization elements 202a-202c, and at least one elevator car travelling along respective at least one shaft between landings. The elevator system is not limited to these and may comprise further components, portions, or elements. The elevator control unit 110 may be configured to control at least party the operation of the elevator system.

Figure 2:
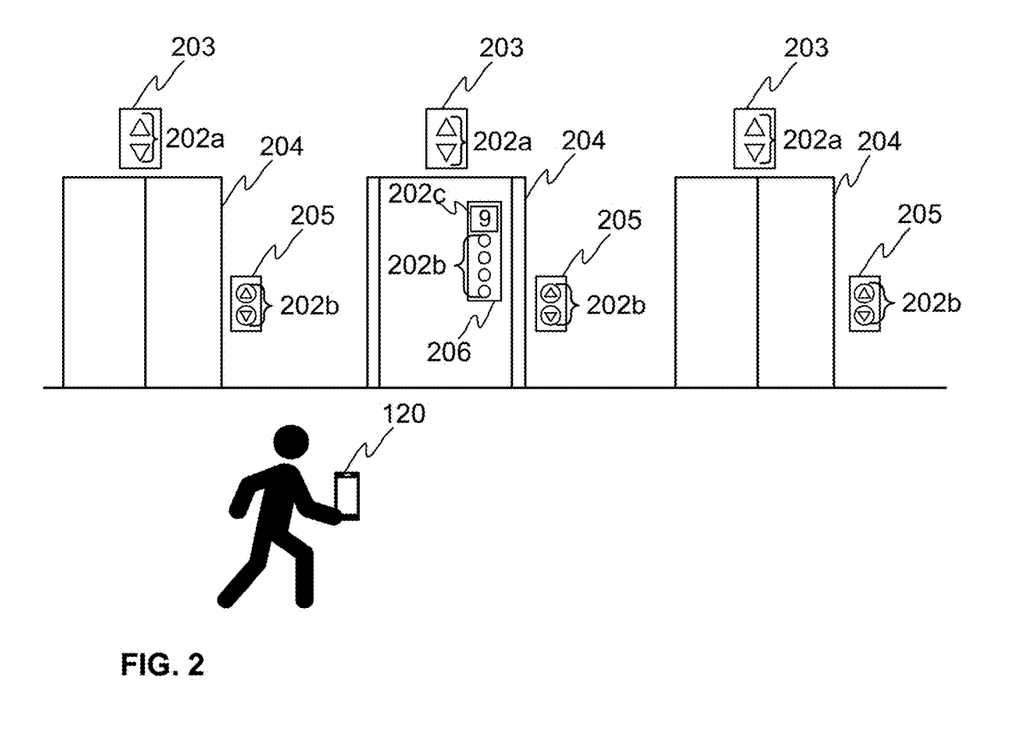
FIG. 2 illustrates schematically an example elevator system, wherein different signalization elements according to embodiments of the invention may be implemented.

According to an example embodiment of the invention the plurality of signalization elements 202a-202c may be light emitting elements. Each signalization element of the plurality of signalization elements 202a-202c may comprise one or more light sources, e.g. a light-emitting diodes (LED) or halogen lights, for emitting light. FIG. 2 illustrates schematically an example elevator system, wherein different signalization elements 202a-202c according to embodiments of the invention may be implemented. The example the elevator system of FIG. 2 comprises three elevator cars travelling along respective three separate elevator shafts (for sake of clarity the elevator cars, the elevator shafts and elevator control unit 110 are not illustrated in FIG. 2). In the example of FIG. 2 only one landing of the elevator system is illustrated, but the elevator system may comprise any number of landings. Each landing may comprise a plurality of signalization elements 202a-202b.

According to an example embodiment of the invention the plurality of signalization elements 202a-202b may comprise one or more signalization elements 202a-202b of one or more hall lantern units 203 arranged to a landing, one or more signalization elements 202a-202b of one or more landing call stations 205 arranged to a landing, one or more signalization elements 202a-202b of a car operating panel 206 arranged inside an elevator car, one or more elevator buttons 202b comprising one or more light sources, and/or one or more matrix displays 202c comprising a plurality of light sources.

The one or more elevator buttons 202b may be for example elevator buttons 202b of a landing call station 205, elevator buttons 202b a car operating panel 206, and/or any other elevator buttons 202b as will be described. Each elevator button 202b may comprise one or more light sources for emitting light in order to indicate the elevator button being activated, e.g. pushed or touched by a passenger.

The one or more matrix displays 202c, each comprising a plurality of lights sources, may be used for indicating the direction of the movement of the elevator, location of the elevator car inside the elevator shaft, and/or any other information representing operation of the elevator system. A hall lantern unit 203, a landing call station 205 and/or a car operating panel 206 may comprise one or more matrix displays 202c as will be described.

The hall lantern unit 203 comprising one or more signalization elements may be arranged in a close vicinity of a landing door 204 of each elevator shaft, e.g. above or next to a landing door 204, for indicating the direction in which the elevator car travelling said elevator shaft is to travel in order to instruct the passenger to select the elevator car that is travelling to the desired direction. The one or more signalization elements of the hall lantern unit 203 may comprise one or more direction indicators 202a for indicating that the elevator car is approaching and the direction in which the elevator car is to travel. The one or more direction indicators 202a of the hall lantern unit 203 may be implemented as separate illuminated signs, preferably in a form of an arrow indicating that the elevator car is approaching and the direction in which the elevator car is to travel. Alternatively, the one or more direction indicators 202a of the hall lantern unit 203 may be implemented as one or more matrix displays indicating that the elevator car is approaching and the direction in which the elevator car is to travel. Furthermore, the hall lantern unit 203 may comprise one or more other signalization elements, e.g. one or more matrix displays 202c for indicating location of the elevator car inside the elevator shaft, and/or any other information representing operation of the elevator system. In the example of FIG. 2 a hall lantern unit 203 comprising two direction indicators 202a, i.e. up indicator and down indicator, are arranged above each landing door 204. Alternatively, the hall lantern units 203 may be arranged next to the landing door.

The landing call station 205 comprising one or more signalization elements may be arranged in a close vicinity of a landing door 204 of each elevator shaft, e.g. next to a landing door 204. The one or more signalization elements of the landing call station 205 may comprise one or more elevator buttons 202b for generating a landing call, i.e. a request to drive the elevator car from said landing to a desired direction, e.g. up direction or down direction. Each elevator button 202b may comprise one or more light sources for emitting light in order to indicate the elevator button being activated, e.g. pushed or touched by a passenger. Furthermore, the landing call station 205 may comprise one or more other signalization elements, e.g. one or more matrix displays 202c for indicating the direction of the movement of the elevator, location of the elevator car inside the elevator shaft, and/or any other information representing operation of the elevator system. In the example of FIG. 2 a landing call station 205 comprising two signalization elements is arranged next to each landing door 204. In the example of FIG. 2 the two signalization elements of the landing call station 205 are elevator buttons 202b.

The one or more signalization elements of the car operating panel 206 may comprise elevator buttons 202b, such as one or more car call buttons for generating elevator car call, i.e. a request to drive the elevator car to a desired landing, emergency stop button, door open button, door close button, alarm button, etc. Each elevator button 202b may comprise one or more light sources for emitting light in order to indicate the elevator button being activated, e.g. pushed or touched by a passenger. Furthermore, the car operating panel 206 may comprise other signalization elements, e.g. one or more matrix displays 202c for indicating the direction of the movement of the elevator, location of the elevator car inside the elevator shaft, and/or any other information representing operation of the elevator system. In the example of FIG. 2 only the car operating panel 206 arranged inside the middle elevator car is shown, because the landing door 204 of the middle elevator shaft is open and the landing doors 204 of the other elevator shafts are closed. However, car operating panels 206 are also arranged inside the other two elevator cars. In the example of FIG. 2 the car operating panel 206 comprises a plurality of signalization elements, i.e. elevator buttons 202b and a matrix display 202c.

The mobile terminal device 120 is configured to generate to the elevator control unit 110 at least one control signal. The control signal comprises an instruction to activate the plurality of the signalization elements 202a-202c according to a predetermined activation pattern. The mobile terminal device 120 may generate the at least one control signal in response to a user interaction, i.e. receiving user input via a user interface 612 of the mobile terminal device 120. For example, a service technician paying a scheduled visit to check and maintain operation of the elevator system, may provide user input via the user interface 612 of the mobile terminal device 120 in order to cause the mobile terminal device 120 to generate the at least one control signal. In response to receiving the at least one control signal from the mobile terminal device 120, the elevator control unit 110 is configured to activate a plurality of the signalization elements 202a-202c according to the predetermined activation pattern for generating inspection information. The activation of the plurality of the signalization elements 202a-202c may comprise turning, i.e. switching, on the one or more light sources of the plurality of signalization elements 202a-202c in order to emit light. The at least one control signal generated from the mobile terminal device 120 may further comprise indication of the signalization elements to be activated, e.g. all the plurality of signalization elements of the elevator system, the plurality of signalization elements arranged to a desired landing, and/or the plurality of signalization elements arranged to a desired elevator car. The user, e.g. the service technician, may provide user input, i.e. select the signalization elements 202a-202c to be activated via the user interface 612 of the mobile terminal devices 120. This enables activation of the plurality of signalization elements arranged to the landing or to the elevator car in which the service technician is may be activated for generating the inspection information. Alternatively, all the signalization elements of the elevator system may be activated, i.e. the plurality of signalization elements arranged to each landing and to each elevator car, but it may cause unnecessary inconvenience for the passengers at the other landings and/or in the other elevator cars, where a service technician is not performing inspection.

The predetermined activation pattern may comprise at least one of the following: temporary simultaneous activation of the plurality of the signalization elements 202a-202c, intermittent activation of the plurality of the signalization elements 202a-202c, consecutive activation of the plurality of the signalization elements 202a-202c. The predetermined activation pattern may be initially defined to be at least one of the above alternatives. Alternatively or in addition, the activation pattern may be defined, e.g. selected, via the user interface 612 of the mobile terminal device 120 before the at least one control signal is generated from the mobile terminal device 120 to the elevator control unit 110. The at least one control signal may further comprise information indicating the predetermined activation pattern.

The temporary simultaneous activation of the plurality of the signalization elements 202a-202c may comprise activation of all of the plurality of signalization elements 202a-202c of the elevator system temporarily substantially at the same time. Alternatively, the temporary simultaneous activation of the plurality of the signalization elements 202a-202c may comprise activation of selected signalization elements of the plurality of signalization elements 202a-202c, e.g. the plurality of signalization elements arranged to one landing, the plurality of signalization elements of a car operating panel arranged inside one elevator car, etc., temporarily substantially at the same time. The duration of the simultaneous temporary activation may be e.g. between 1 to 20 seconds, but is not limited to that. The reasonable duration may depend on number of the signalization elements 202a-202c, switching scheme, etc.

The intermittent activation of the plurality of the signalization elements 202a202c may comprise flashing, i.e. blinking, of the one or more light sources of all of the plurality of the signalization elements 202a-202c simultaneously, randomly, or in a predetermined order. Alternatively, the intermittent activation of the plurality of the signalization elements 202a-202c may comprise flashing, i.e. blinking, of the one or more light sources of selected signalization elements of the plurality of the signalization elements 202a-202c, e.g. the plurality of signalization elements arranged to one landing, the plurality of signalization elements of a car operating panel arranged inside one elevator car, etc., simultaneously, randomly, or in a predetermined order.

The consecutive activation of the plurality of the signalization elements 202a202c may comprise activation of all of the plurality of the signalization elements 202a-202c each at a time during a predetermined time in a predetermined order or in a random order. Alternatively, the consecutive activation of the plurality of the signalization elements 202a-202c may comprise activation of selected signalization elements of the plurality of the signalization elements 202a-202c, e.g. the plurality of signalization elements arranged to one landing, the plurality of signalization elements of a car operating panel arranged inside one elevator car, etc., each at a time during a predetermined time in a predetermined order or in a random order. The predetermined time may be e.g. between 1 to 20 seconds but is not limited to that. The reasonable predetermine time may depend on number of the signalization elements 202a-202c, switching scheme, etc.

The generated inspection information may be visual inspection information. For example, in response to activation of the plurality of the signalization elements 202a-202c, the service technician may visually inspect the functionality of each and every of the activated plurality of signalization elements 202a202c within a short time in order to detect defected, i.e. broken, signalization elements. This enables a quick and easy way to generate inspection information of the plurality of signalization elements 202a-202c. For example, if a plurality of signalization elements 202a-202c of one landing are activated according to the predetermined activation pattern in response to receiving the at least one control signal, the light sources of the functioning signalization elements are emitting light and the light sources of the defected signalization elements do not emit light, which enables that the service technician may easily and quickly detect the defected signalization elements that need to be repaired or replaced with a functioning signalization elements.

According to an example embodiment of the invention the at least one control signal may further comprise an instruction to instruct the elevator system to an inspection state, in which the plurality of the signalization elements 202a-202c is configured to be activated according to the predetermined activation pattern. In response to receiving the at least one control signal comprising the instruction to instruct the elevator system to an inspection state, the elevator control unit 110 first instructs the elevator system into the inspection state and when the elevator system is in the inspection state the elevator control unit 110 activates the plurality of the signalization elements 202a-202c according to the predetermined activation pattern as discussed above. In the inspection state the elevator system may be operating as in a normal operation state of the elevator system, but in the inspection state also controlling of the plurality of the signalization elements 202a-202c for the inspection purposes alongside the normal elevator operation is enabled. The normal elevator operation state may comprise e.g. performing one or more elevator operations to serve passengers and/or load to travel between landings.

Figure 6:
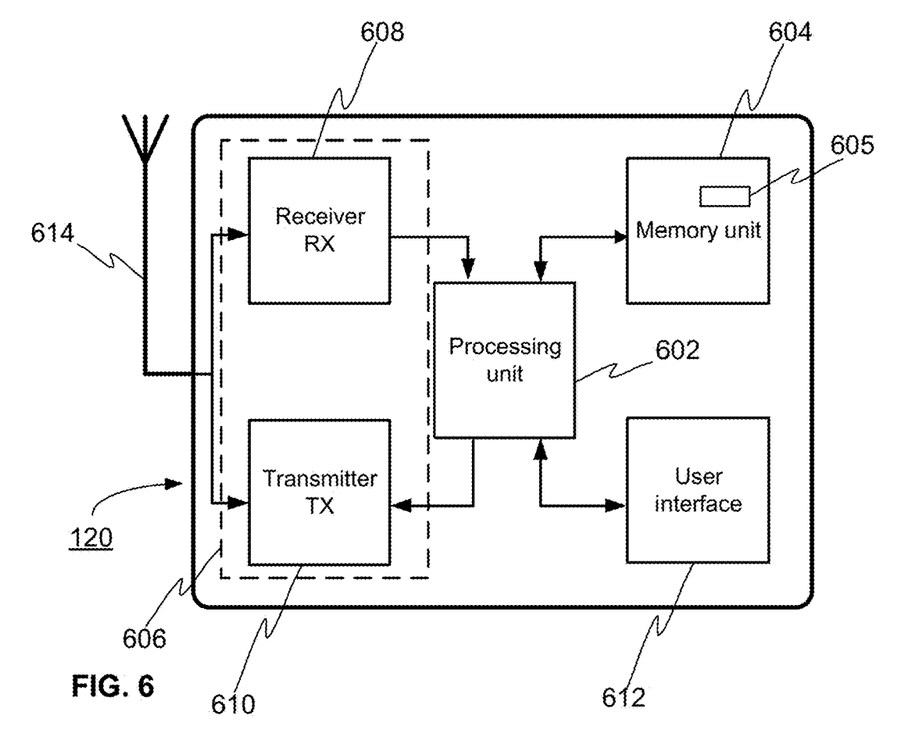
FIG. 6 schematically illustrates an example of at least some components of a mobile terminal device according to the invention.

According to an example embodiment of the invention the mobile terminal device 120 may further be configured to generate to the elevator control unit 110 at least one second control signal. The at least one second control signal may comprise an instruction to return the elevator system to the normal elevator operation state from the inspection state. The mobile terminal device 120 may generate the at least one second control signal in response to a user interaction, i.e. receiving user input via the user interface 612 of the mobile terminal device 120. For example, the service technician may provide the user input via the user interface 612 of the mobile terminal device 120 after performing the visual check of the plurality of the signalization elements in order to cause the mobile terminal device 120 to generate the at least one second control signal. In response to receiving the at least one second control signal, the elevator control unit 110 may be configured to return the elevator system to the normal elevator operation state from the inspection state.

Alternatively, according to an example embodiment of the invention the elevator control unit 110 may be configured to return the elevator system to the normal elevator operation state from the inspection state after a predetermined period of time. The predetermined period of time may be an initially defined constant period of time and/or the predetermined period of time may be defined via the user interface 612 of the mobile terminal device 120 before the at least one control signal is generated from the mobile terminal device 120 to the elevator control unit 110. The at least one control signal may comprise information indicating the predetermined period of time after which the elevator control unit 110 may be configured to return the elevator system to the normal elevator operation state from the inspection state.

According to an example embodiment of the invention the elevator control unit 110 may be configured to activate the plurality of the signalization elements 202a-202c regardless of a location of at least one elevator car travelling inside respective at least one elevator shaft. This enables that the activation of the plurality of the signalization elements 202a-202c may be performed even though the at least one elevator car resides at another landing or is travelling between landings. Thus, there is no need to wait that the at least one elevator car arrives at a desired landing to generate the inspection information. This expedites the inspection of the plurality of the signalization elements 202a202c.

Figure 3:
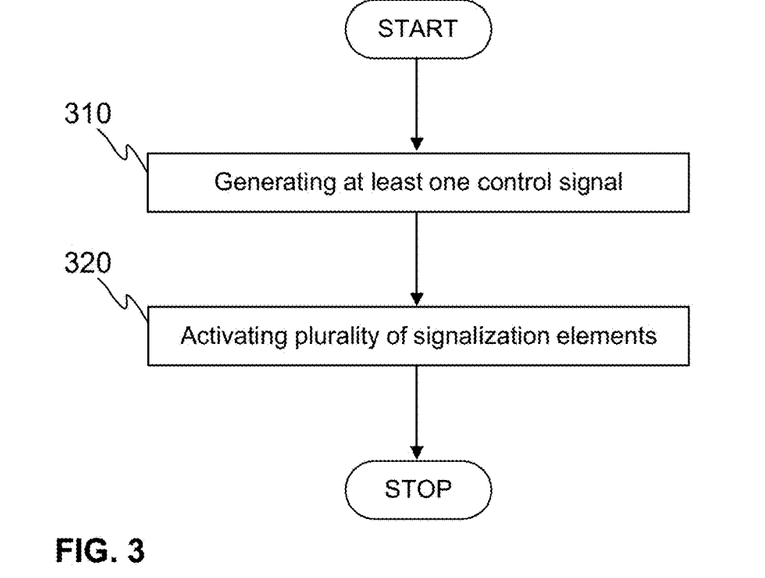
FIG. 3 illustrates schematically an example of a method according to the invention.

Next an example of a method for generating inspection information of a plurality of signalization elements of an elevator system according to the invention is described by referring to FIG. 3. FIG. 3 schematically illustrates the invention as a flow chart. At the step 310 the method comprises generating from a mobile terminal device 120 to an elevator control unit 110 at least one control signal comprising an instruction to activate the plurality of the signalization elements 202a-202c according to the predetermined activation pattern as discussed above. At the step 320 the method comprises activating the plurality of the signalization elements 202a-202c according to the predetermined activation pattern for generating inspection information in response to receiving the at least one control signal.

Figure 4A:
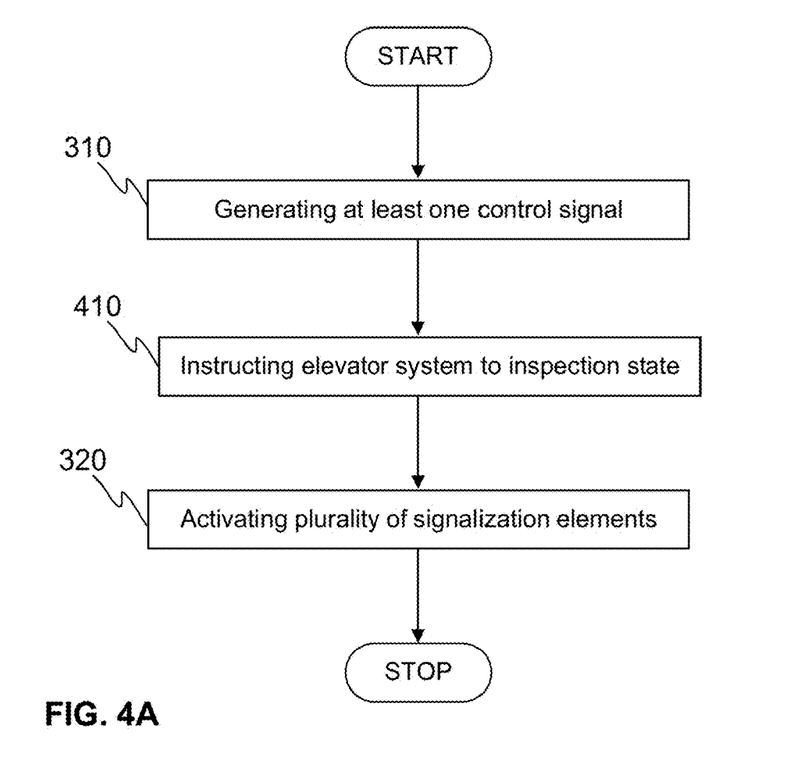
FIG. 4A illustrates schematically another example of a method according to the invention.

According to an example embodiment of the invention, the at least one control signal may comprise further an instruction to instruct the elevator system to an inspection state in which the plurality of the signalization elements is configured to be activated according to the predetermined activation pattern. This is illustrated in FIG. 4A, wherein another example of a method according to the invention is illustrated. At the step 410 the method may comprise instructing 410 the elevator system to the inspection state. At the step 320 the method comprises activating the plurality of the signalization elements 202a-202c according to the predetermined activation pattern when the elevator system is in the inspection state as discussed above.

Figure 4B:
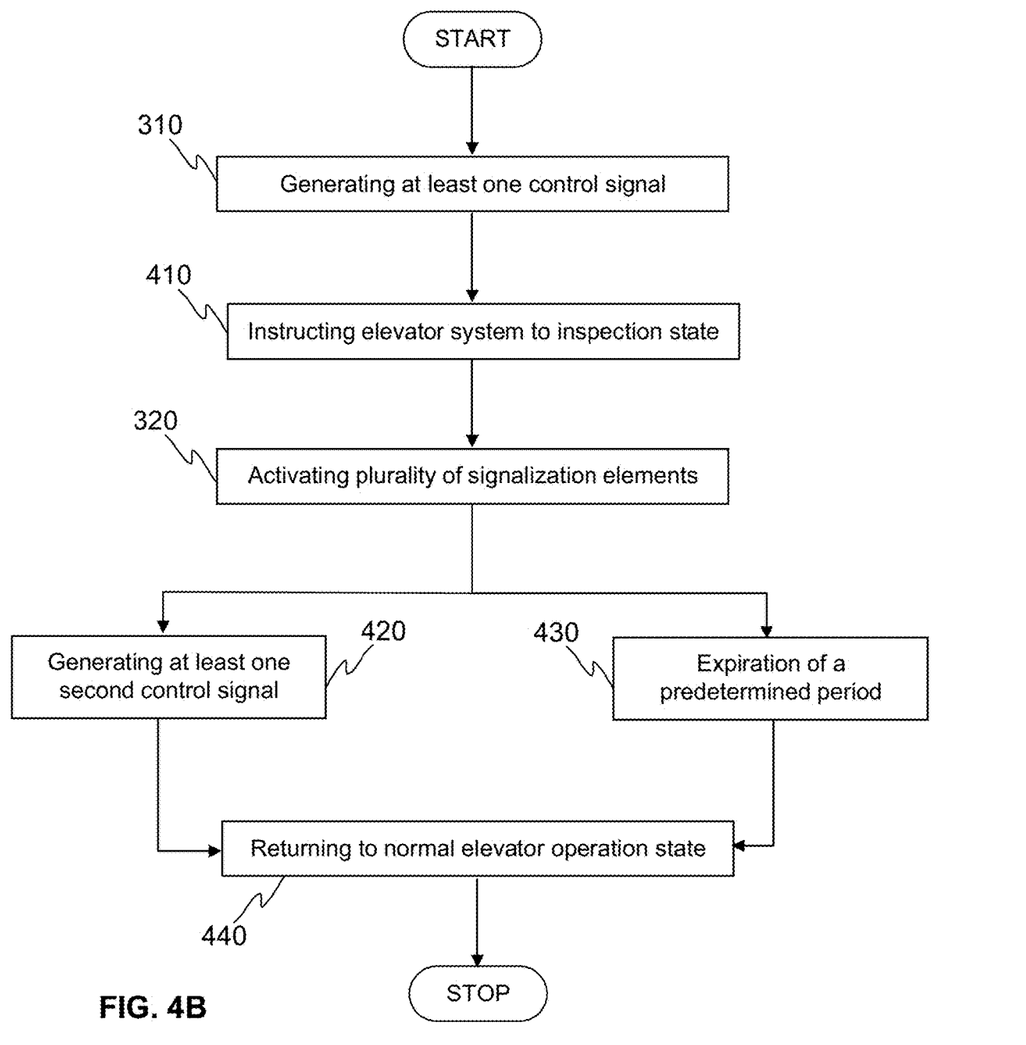
FIG. 4B illustrates schematically another example of a method according to the invention.

According to an example embodiment of the invention, the method may further comprise generating from the mobile terminal device 120 to the elevator control unit 110 at least one second control signal. The at least one second control signal may comprise an instruction to return the elevator system to a normal elevator operation state from the inspection state. Alternatively, according to an example embodiment of the invention the method may further comprise returning the elevator system to a normal elevator operation state from the inspection state after expiration of a predetermined period of time as discussed above. These example embodiments of the invention are illustrated in FIG. 4B, wherein another example of a method according to the invention is illustrated. At the step 420 the method may comprise generating at least one control signal from the mobile terminal device 120 to the elevator control unit 110. At the step 430 the method may comprise further expiration of a predetermined period. At the step 440 the method may comprise returning the elevator system to the normal elevator operation state from the inspection state in response to receiving the at least one second control signal or after the predetermined period of time.

According to an example embodiment of the invention, the plurality of the signalization elements 202a-202c may be activated regardless of the location of one or more elevator cars travelling inside respective one or more elevator shafts.

Figure 5:
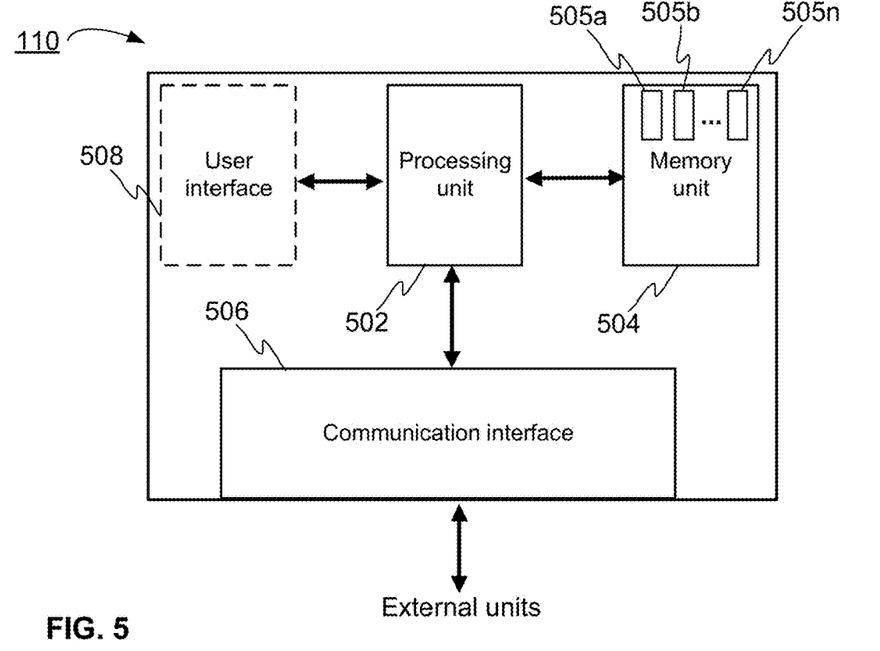
FIG. 5 schematically illustrates an example of at least some components of an elevator control unit according to the invention.

FIG. 5 illustrates schematically, as a block diagram, an example of at least some components of the elevator control unit 110 according to the invention. The elevator control unit 110 may comprise a processing unit 502 comprising one or more processors, a memory unit 504 comprising one or more memories, a communication unit 506 comprising one or more communication devices, and possibly a user interface (UI) 508. The mentioned elements of may be communicatively coupled to each other with e.g. an internal bus. The one or more processors of the processing unit 502 may be any suitable processor for processing information and control the operation of the elevator control unit 110, among other tasks. The memory unit 504 may store portions of computer program code 505a-505n and any other data, and the processing unit 502 may cause the elevator control unit 110 to operate as described by executing at least some portions of the computer program code 505a-505n stored in the memory unit 504. Furthermore, the one or more memories of the memory unit 504 may be volatile or nonvolatile. Moreover, the one or more memories are not limited to a certain type of memory only, but any memory type suitable for storing the described pieces of information may be applied in the context of the invention. The communication unit 508 may be based on at least one known communication technologies, either wired or wireless, in order to exchange pieces of information as described earlier. The communication unit 506 provides an interface for communication with any external unit, such as the mobile terminal device 120, the remote server 130, database and/or any external systems. The user interface 508 may comprise input/output (I/O) devices, such as buttons, keyboard, touch screen, microphone, loudspeaker, display and so on, for receiving input and outputting information. The implementation of the elevator control unit 110 may be done as a stand-alone entity or as a distributed controlling environment between a plurality of stand-alone devices, such as a plurality of controllers providing distributed processing resource.

FIG. 6 illustrates schematically, as a block diagram, an example of some components of a mobile terminal device 120 according to the invention. The mobile terminal device 120 may be one of the following: a mobile phone, a tablet computer, a dedicated mobile inspection device. The dedicated mobile inspection device may be a mobile device dedicated for performing at least some of the steps of the inspection method according to the invention. The mobile terminal device 120 may comprise further components or portions in addition to those shown in FIG. 6. For example, the mobile terminal device 120 may comprise one or more sensors configured to monitor one or more parameters having possible relation, or impact, to an operation of the mobile device 130; a battery for providing energy for the operation of the mobile terminal device 120; and/or one or more smart cards, such as SIM.

The mobile terminal device 120 of FIG. 6 comprises a processing unit 602 comprising one or more processors, a memory unit 604 comprising one or more memories for storing computer program code 605 and any data, a communication unit 606 comprising one or more receivers 608 and one or more transmitters 610, and one or more user interfaces 612. The implementation of the operations of the mobile terminal device 120 according to the invention as described above may be arranged so that a computer program code 605 with necessary parameters is stored in the memory unit 604 and when the computer program code 605 is executed by the one or more processors of the processing unit 602 of the mobile terminal device 120 is caused to perform as described above. The communication unit 606, as already mentioned, comprises one or more receivers 608 and one or more transmitters 610, which may comprise devices for coupling to one or more mobile communication networks, devices for coupling to one or more wireless local area networks as well as devices for implementing any short-range communication technology, such as Bluetooth, in order to communicate with the elevator control unit 110 as described. For the purpose of the communication the mobile terminal device 120 may comprise one or more antennas 614. The user interface 612 may comprise I/O (input/output) devices, such as buttons, keyboard, touch screen, microphone, loudspeaker, display and so on, for receiving user input from a user of the mobile terminal device 120 and/or providing output to the user of the mobile terminal device 120.

For sake of clarity although at least some of the components in the mobile terminal device are illustrated as single components, any of the components may, however, be implemented as respective one or more separate components, some or all of which may be integrated/removable. Hence, the number of physical and operational components within each block may vary from the illustration.

One advantage of the above described invention is that it enables a quick and easy way to generate inspection information of a plurality of signalization elements, which expedites the inspection of the plurality of the signalization elements and reduces the maintenance visit time. Moreover, the above described invention may improve the coverage and/or reliability of the inspection of the signalization elements of the elevator system, because the invention enables that every inspected defected signalization element may be detected from the generated inspection information and repaired or replaced with a functioning signalization element during the inspection visit.

The specific examples provided in the description given above should not be construed as limiting the applicability and/or the interpretation of the appended claims. Lists and groups of examples provided in the description given above are not exhaustive unless otherwise explicitly stated.

The invention claimed is:

1. A system for generating inspection information of a plurality of signalization elements of an elevator system, the system comprising:
    an elevator controller configured to activate a number of the plurality of the signalization elements of the elevator system in response to an activation instruction such that activated ones of the plurality of signalization elements provide feedback to a user indicating whether the plurality of signalization elements are operational, and
    a mobile terminal device configured to generate the activation instruction in response to input from the user, the activation instruction indicating which of the plurality of signalization elements to activate based on a set activation pattern, wherein
    the plurality of signalization elements comprises one or more signalization elements of one or more hall lantern units arranged to a landing, one or more signalization elements of one or more landing call stations arranged to the landing, one or more signalization elements of a car operating panel arranged inside an elevator car, one or more elevator buttons including one or more light sources, and/or one or more matrix displays including a plurality of light sources.

2. The system according to claim 1, wherein, in response to the activation instruction, the elevator controller is configured to switch the elevator system to an inspection state in which the plurality of the signalization elements is configured to be activated according to the set activation pattern.

3. The system according to claim 2, wherein
    the mobile terminal device is further configured to generate a deactivation instruction to return the elevator system to a normal elevator operation state from the inspection state, and
    the elevator controller is configured to return the elevator system to the normal elevator operation state from the inspection state in response to receiving the deactivation instruction.

4. The system according to claim 2, wherein the elevator controller is configured to return the elevator system to a normal elevator operation state from the inspection state after a set period of time.

5. The system according to claim 1, wherein
    the plurality of signalization elements are is associated with at least one landing floor, and
    the elevator controller is configured to activate the number of the plurality of the signalization elements without calling an elevator car to the at least one landing floor.

6. The system according to claim 1, wherein the set activation pattern instructs the activated ones of the signalization elements to activate one of: simultaneously, intermittently, or consecutively.

7. The system according to claim 1, wherein the plurality of signalization elements are light emitting elements.

8. The system according to claim 1, wherein the mobile terminal device is one of: a mobile phone, a tablet computer, or a dedicated mobile device.

9. The system according to claim 1, wherein the mobile terminal device is communicatively coupled to the elevator controller directly or via an external device.

10. The system according to claim 1, wherein the elevator controller configured to control the plurality of signalization elements directly or indirectly.

11. The system according to claim 1, wherein the plurality of signalization elements includes devices mounted on landing floors of a building and each configured to illuminate, and
the elevator controller is configured to activate the number of the plurality of signalization elements such that the activated ones of the plurality of signalization elements illuminate to output visual feedback to respective ones of the landing floors based on the set activation pattern.

12. A method for generating inspection information of a plurality of signalization elements of an elevator system, the method comprising:
generating, via a mobile terminal device, an activation instruction in response to input from a user, the activation instruction indicating which of the plurality of the signalization elements to activate according to a set activation pattern; and
activating, via an elevator controller, a number of the plurality of the signalization elements in response to the activation instruction such that activated ones of the plurality of signalization elements provide feedback to the user indicating whether the plurality of signalization elements are operational, wherein
the plurality of signalization elements comprises one or more signalization elements of one or more hall lantern units arranged to a landing, one or more signalization elements of one or more landing call station arranged to the landing, one or more signalization elements of a car operating panel arranged inside an elevator car, one or more elevator buttons including one or more light sources, and/or one or more matrix displays including a plurality of light sources.

13. The method according to claim 12, wherein the activating comprises:
switching the elevator system to an inspection state in which the plurality of the signalization elements is configured to be activated according to the set activation pattern.

14. The method according to claim 13, further comprising:
generating, via the mobile terminal device, a deactivation instruction to return the elevator system to a normal elevator operation state from the inspection state, and
returning the elevator system to the normal elevator operation state from the inspection state in response to the deactivation instruction.

15. The method according to claim 13, further comprising:
returning the elevator system to a normal elevator operation state from the inspection state after expiration of a set period of time.

16. The method according to claim 12, wherein
the plurality of signalization elements are associated with at least one landing floor, and
the activating activates the number of the plurality of the signalization elements without calling an elevator car to the at least one landing floor.

17. The method according to claim 12, wherein the set activation pattern instructs the activated ones of the signalization elements to activate one of: simultaneously, intermittently, or consecutively.

18. The method according to claim 12, wherein the plurality of signalization elements are light emitting elements.

19. The method according to claim 12, wherein the mobile terminal device is one of: a mobile phone, a tablet computer, or a dedicated mobile inspection device.

20. The method according to claim 12, wherein the mobile terminal device is communicatively coupled to the elevator controller directly or via an external device.

21. The method according to claim 12, wherein the plurality of signalization elements includes devices mounted on landing floors of a building and each configured to illuminate, and
the activating activates the number of the plurality of signalization elements such that the activated ones of the plurality of signalization elements illuminate to output visual feedback to respective ones of the landing floors based on the set activation pattern.

* * * * *